Jan. 21, 1941.   G. H. ZENNER ET AL   2,229,080
DOUBLE-WALLED CONTAINER FOR TANK CARS
Filed Aug. 19, 1939   6 Sheets-Sheet 3
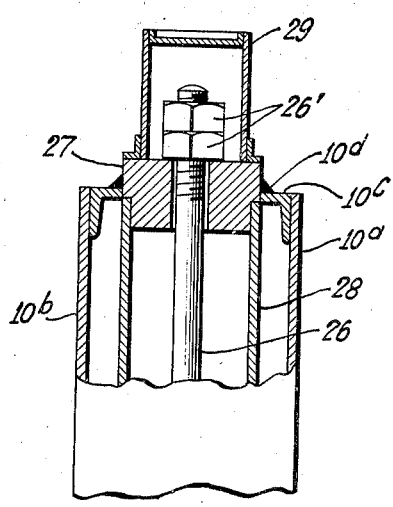
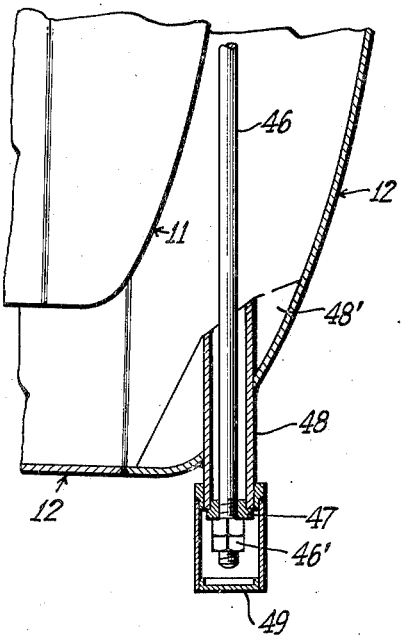
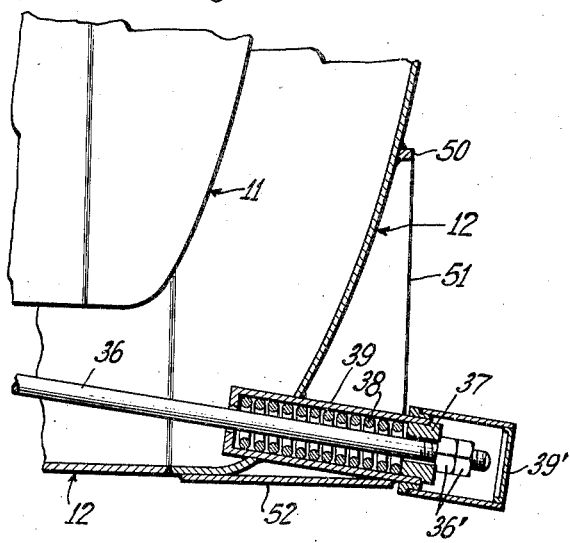
INVENTORS
George H. Zenner, James B. Van Vleet,
& Odd A. Hansen
BY
Watson, Bristol, Johnson & Leavenworth
ATTORNEYS Jan. 21, 1941.  G. H. ZENNER ET AL  2,229,080
DOUBLE-WALLED CONTAINER FOR TANK CARS
Filed Aug. 19, 1939  6 Sheets-Sheet 4

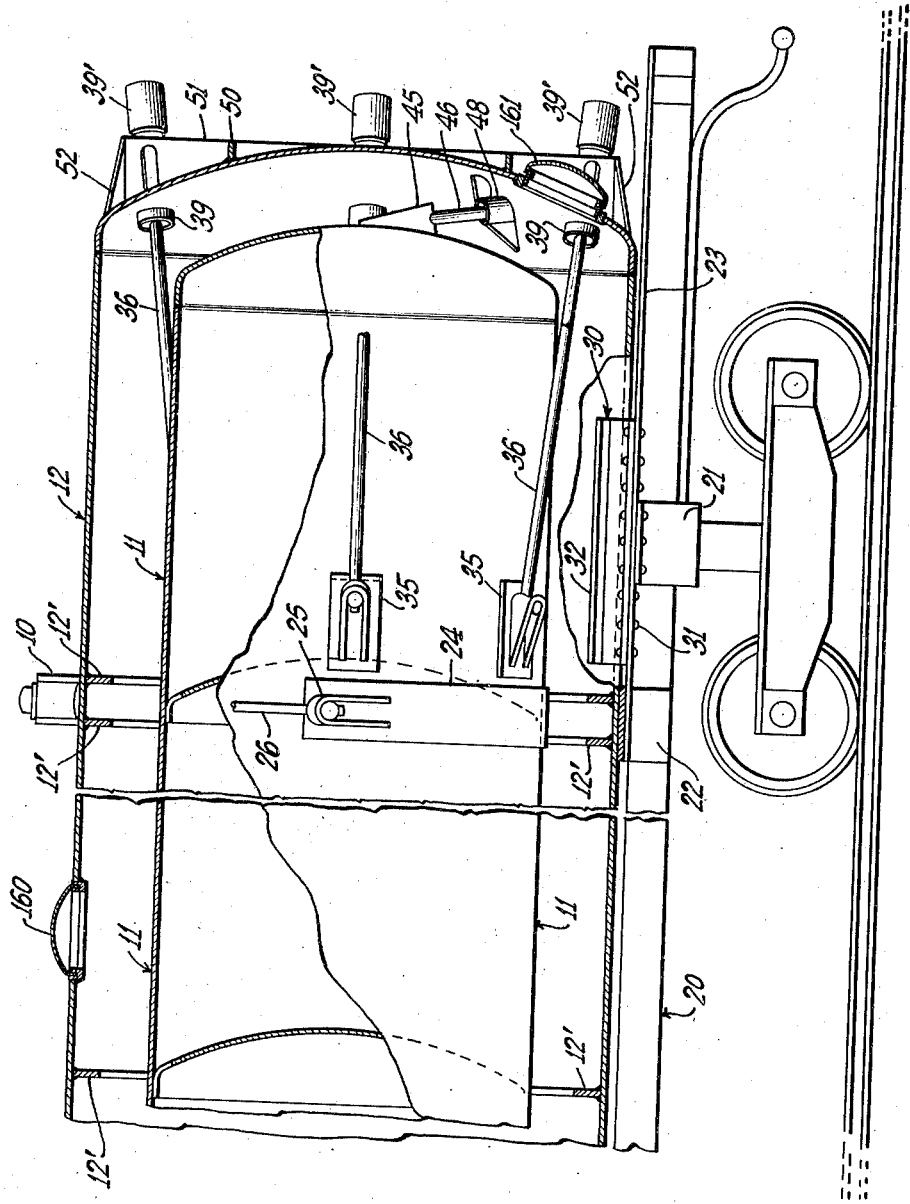

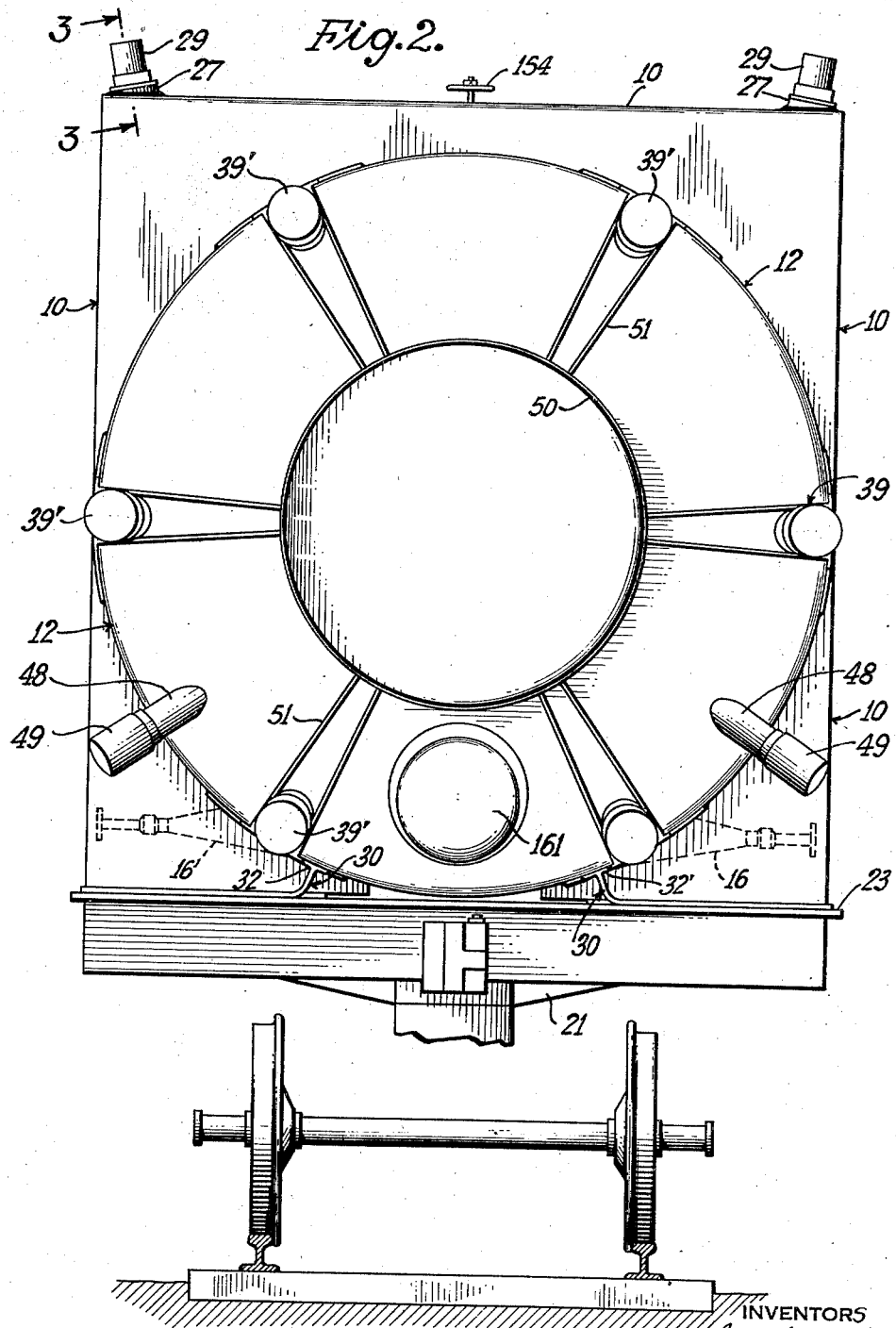

INVENTORS
George H. Zenner, James D. VanVleet
& Odd A. Hansen
BY Watson, Bristol, Johnson & Leavenworth
ATTORNEYS Jan. 21, 1941.    G. H. ZENNER ET AL    2,229,080
DOUBLE-WALLED CONTAINER FOR TANK CARS
Filed Aug. 19, 1939    6 Sheets-Sheet 5

INVENTORS
George H. Zenner, James F. Van Vleet,
BY Odd A. Hansen
Watson, Bristol, Johnson & Leavenworth
ATTORNEYS Jan. 21, 1941.　　　G. H. ZENNER ET AL　　　2,229,080
DOUBLE-WALLED CONTAINER FOR TANK CARS
Filed Aug. 19, 1939　　　6 Sheets-Sheet 6

INVENTORS
George H. Zenner, James D. Van Vleet
BY & Odd A. Hansen
Watson, Bristol, Johnson & Leavenworth
ATTORNEYS Patented Jan. 21, 1941

2,229,080

UNITED STATES PATENT OFFICE 2,229,080

DOUBLE-WALLED CONTAINER FOR TANK CARS

George H. Zenner, James G. Van Vleet, and Odd A. Hansen, Kenmore, N. Y., assignors to The Linde Air Products Company, New York, N. Y., a corporation of Ohio Application August 19, 1939, Serial No. 290,971

8 Claims. (Cl. 105—358)

This invention relates to double-walled containers for tank cars and the like which are adapted for storing and/or transporting a liquefied gas, such as liquid oxygen, and more particularly to a construction and arrangement of parts for suspending and bracing the walls of the inner and outer cylindrical vessels of such containers, the space between the vessels being preferably filled with a suitable insulating powder and evacuated.

The invention has for its object generally the provision of improved suspending and bracing means for the inner and outer vessels of double-walled containers for tank cars in a manner which affords support for each of the vessels without transmitting undue stresses to the other, and also provides bracing against undesired relative motion and redistributes the stresses in a manner reducing the strains.

Another object is to provide a construction for the containers of tank cars having evacuated insulating spaces, which employs internal and external bracing arranged to resolve stresses in the end walls of the component vessels and transmitting components of the stresses to side walls.

Another object is to provide an improved means for supporting and bracing the inner vessel of double-walled cylindrical containers in a manner avoiding swaying of the inner vessel from side to side.

Still another object is to provide a construction and arrangement of parts for mounting inner and outer cylindrical vessels in vacuum insulated containers arranged to withstand side and end thrusts, such as are commonly experienced in transit.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is a view of a construction for double-walled insulating tank cars, partly in elevation and partly in vertical section (the plane of the section passing through the longitudinal axis of the car), which is adapted for storing and/or transporting liquid oxygen in accordance with the invention;

Fig. 2 is an end elevational view showing the construction of the bracing on the end of the outer vessel of the tank car shown in Fig. 1;

Fig. 3 is a fragmentary sectional view taken on line 3—3 of Fig. 2, showing details of the supporting frame employed in the tank car shown in Fig. 1;

Figs. 4 and 5 are detailed sectional views of bracing means here incorporated in the outer vessel of the tank car;

Figure 10:
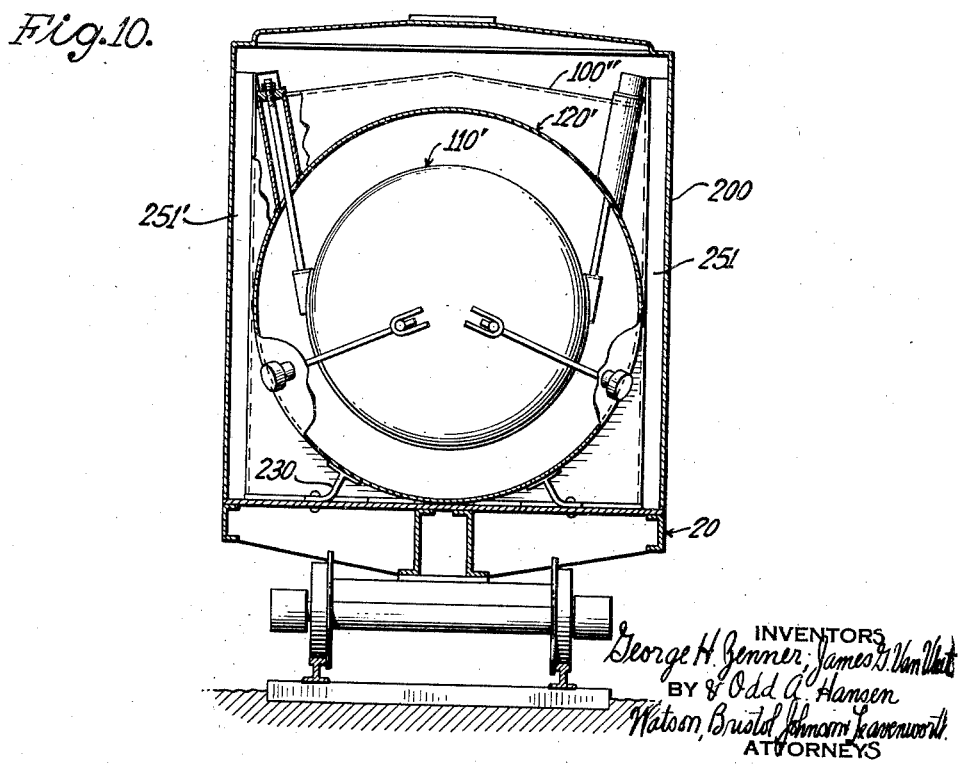
Fig. 10 is a vertical sectional view taken on the line 10—10 in Fig. 9.

Referring now to the drawings, and particularly to Figs. 1 and 2, 10 denotes an external frame, two or more of which may be provided for supporting the cylindrical wall of an inner vessel 11. The vessel 11 also has end walls and is adapted to hold the liquefied gas that is to be placed or stored in the tank car either with or without the aid of a lining or basket (not shown). Outside of the vessel 11 and spaced therefrom is a second or outer vessel 12 which is also supported from the frames provided, the manner of support being hereinafter more fully explained. The space between the vessels is a closed space and preferably has no communication with the outside except that provided through an evacuating connection, hereinafter described. Suitable liquid supplying and withdrawal connections are provided, as well as suitable gas withdrawal or escape connections. These are here indicated in position diagrammatically and may be conveniently located, as for example, near the center of the car and near the side sills, as shown at 16 and 16' in Fig. 2.

In the construction for tank cars here provided, the wall of the outer vessel is preferably braced against collapse and has one or more interiorly disposed stiffening rings, as shown at 12'. The frames 10 which support the vessels are also preferably made as relatively narrow structures, each made of one or more plate members with an open or cut-away central portion shaped to permit the snug passage of the outer vessel 12 through the same and its rigid attachment thereto, by welding or other suitable means. An advantageous form of structure for a frame 10 is shown in Figs. 2 and 3, where it is seen to comprise a pair of parallel substantially rectangular plates 10a and 10b united at their edges by stiffening webs 10c. The openings in the plates are of sufficient diameter to permit a relatively snug passage of the vessel 12 through the same. Each frame 10 so constructed is mounted on the car frame and disposed at right angles to the longitudinal axis of the car. The car frame may, of course, be of any suitable form, but is here shown as consisting of a center sill 20 that may include side sills (not shown). The car frame, as shown, is provided with the usual bolsters depicted at 21, to which are pivotally connected the car trucks. To provide firm support for the frames 10 on the car frame, a corresponding number of auxiliary bolsters 22 are incorporated in the frame. These may be adjacent to but displaced from the main bolsters. A strengthening plate 23 is preferably interposed, as shown at the end of the car frame, between a bolster 22 and a frame 10, as indicated. The strengthening plate 23 thus provided is made fast, by riveting or otherwise, to the sills and bolsters of the car frame.

In order to support the vessel 11 directly from a frame 10 and not from the surface of the walls of vessel 12, a girth member or sling 24 is passed about the under side of vessel 11 adjacent an end of the same, the upper ends of each sling being provided with brackets or lugs as shown at 25. Attached to each bracket is a sustaining rod or cable 26 of relatively low thermal conductivity which extends upwardly and outwardly and is secured at the upper end to the frame 10 in a suitable manner, for example, by means of a collar 27 (see Fig. 3) that is made fast in the top web 10c by a fillet of welding metal, as shown at 10d. Each rod 26 is threaded at its upper end and passed through the collar 27 to receive one or more sustaining nuts 26' in threaded engagement with its upper end.

In order to pass the rods 26 through the wall of the outer vessel in a gas-tight manner, such wall is cut away in the region where the rod is to pass and a sleeve 28 disposed thereabout and made gas-tight by attaching one end to the wall by welding or brazing, the other end being attached to the lower end of collar 27 which is preferably reduced for the reception of the sleeve, the joint being sealed by welding or brazing. The joint between collar and nuts is made gas-tight while at the same time preserving the adjustability of nuts 26' by disposing a cap or housing 29 over the nuts 26' and securing the same in position on the collar 27 by soft solder, or other readily removable sealing agent.

The frames 10 are disposed along the car frame at points which effect a desired distribution of the weight and other stresses, the use of bolsters, in addition to the conventional bolsters over the car trucks, readily permitting this. The construction of frames 10 and the provision of additional bolsters, while preferable, are no part of the present invention, the construction of the frames 10 and the use of additional bolsters being taught and claimed in copending application, Serial No. 290,970, filed August 19, 1939, in the name of O. A. Hansen.

In order that the outer vessel 12 may be braced against end thrusts and otherwise afford additional support therefor, one or more web members, such as shown at 30, are interposed between the car frame and the outside wall of the vessel 12 at suitable points, for example, adjacent the auxiliary bolster 22. Such web members are conveniently formed by taking an I-beam and cutting off the bottom flange and then bending over the web so as to provide an angle-portion that may be bolted to the plate 23 as indicated at 31, the top flange 32 of the I-beam being welded or otherwise arranged to make imperforate engagement with the outer wall of the vessel 12.

In order that the inner vessel 11 may be braced against end thrusts and at the same time accommodate expansion and contraction of the same, the inner vessel 11 is supported at each end from the adjacent end of vessel 12 by tension suspension means. Such means is here shown as comprising a plurality of horizontally disposed brackets or lugs 35 disposed circumferentially about and secured by welding adjacent each end of vessel 11. Attached to each of these brackets is a tension rod or cable 36 of relatively low thermal conductivity which extends generally horizontally but flares outwardly toward the edge of the adjacent end of vessel 12 and is preferably resiliently anchored thereto in a gas-tight manner.

Suitable staying means of this character are shown in Fig. 5 where the outer ends of rods 36 are indicated as threaded and have a set of nuts 36' in threaded engagement therewith and arranged to react against a collar 37 that works against a spring 38 disposed in a cylindrical receptacle 39, which latter has a partially closed inner end for supporting the spring and is made fast by welding or otherwise in the end wall of vessel 12. This receptacle is made gas-tight, while at the same time preserving the adjustability of nuts 36', by snugly fitting a housing 39' over the outer end of the receptacle and soft soldering the housing in place. A resolving or thrust member 52, as hereinafter more fully described, is with advantage disposed between a point at the back of the receptacle and an adjacent point on the end of the cylindrical wall of vessel 12. The collars 37 here employed each preferably has a shoulder, as indicated, serving as a stop to prevent unlimited inward motion of the collar against the spring 38, the adjustment being such that the shoulders are engaged when the vessel 11 is contracted or filled with liquid. Any suitable number of the rods 36 may be employed. The support of tension rods at the other end of vessel 11 is similar and may incorporate or dispense with springs 38, as those at one end can be made to take up all the expansion desired.

In order that the inner vessel 11 may also be braced against side swaying, still a third set of supporting and staying means are applied to the inner vessel. This third means, as shown in Figs. 1 and 4, comprises two or more brackets 45 made fast by brazing or welding to the end wall of vessel 11 at points preferably nearer the center of the end wall; the two brackets may be disposed at an angle which is symmetrical, for example, angles which have equal values at each side of a line coinciding with the vertical. From each of the brackets 45 extends downwardly and outwardly a rod or cable 46 of relatively low thermal conductivity; each such rod having its lower end threaded and nuts 46' disposed in engagement therewith, such nuts being arranged to bear on a collar 47 which has its inner end reduced and sealed in a gas-tight manner in a sleeve 48 secured by welding in the end wall of vessel 12. The rigidity of the sleeve is insured by providing the sleeve with such a length that a portion extends well into the space between the vessels 11 and 12 and inserting and securing about it by brazing or welding a plurality of bracing webs or stays 48'. A housing 49 is then soft soldered in place over the outer end of each sleeve 48, thereby preserving imperforate the outer wall of vessel 12. The two stays thus provided preferably lie in a plane that is not greatly inclined to the vertical, in order that they may not be appreciably affected by the longitudinal expansion and contraction of vessel 11.

The anchorage for the staying means, above described, may tend to an undesirable concentration of stress at certain points unless suitable stress redistributing means are employed. In the present invention, such means resolve the stresses and redistribute the same. This is here accomplished in connection with the receptacles 39 by means of a truss-like structure on the end wall of vessel 12. As shown, this structure comprises a central ring 50 mounted on the end of vessel 12 and preferably concentric therewith, the ring having a plurality of pairs of integrally attached radial members 51 distributed thereabout at points adapted to embrace the sides of each housing 39, the whole being made fast thereto by welding or brazing. The resolving or thrust members 52, already referred to, are incorporated in this structure and complete a rigid triangular frame with the radial members that transmits the stress it takes up and converts it to a compressional stress transmitted to a cylindrical portion of the outer wall of vessel 12.

One or more openings serving as manholes are also provided in the wall of the outer vessel through which access may be had for the purpose of disposing a filling of a substantially dry heat insulating material in comminuted form in the space between the walls of the inner and outer vessels. One such manhole is shown at 160 in the top wall of the outer vessel. Another is shown at 161 near the bottom of the end wall of vessel 12. Such manhole covers are soft soldered or brazed in place in order that the space between the inner and outer vessels may at all times be hermetically sealed.

Figure 6:
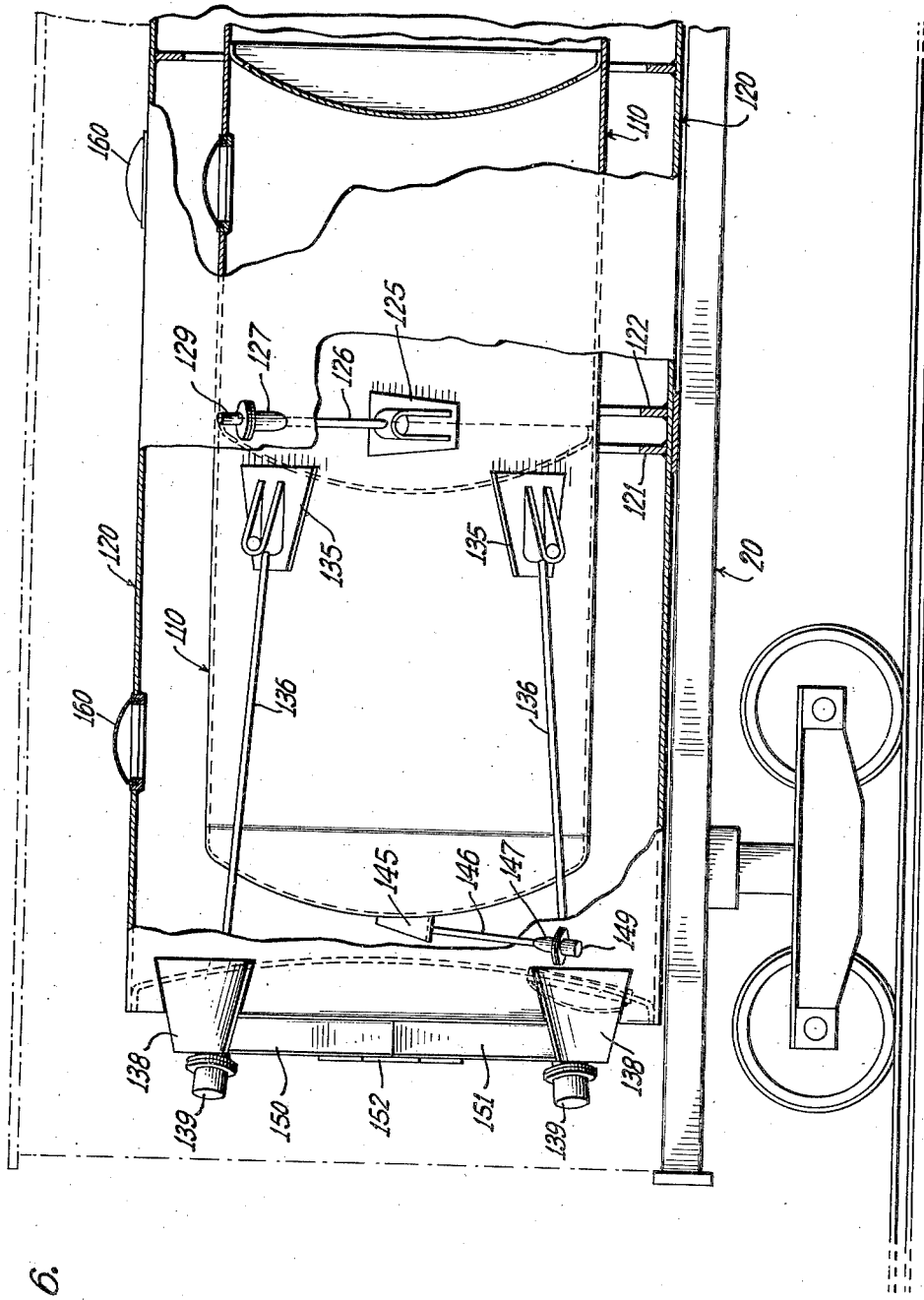
Fig. 6 is a fragmentary elevational view, similar to Fig. 1, showing a modified form of the invention.
Figure 7:
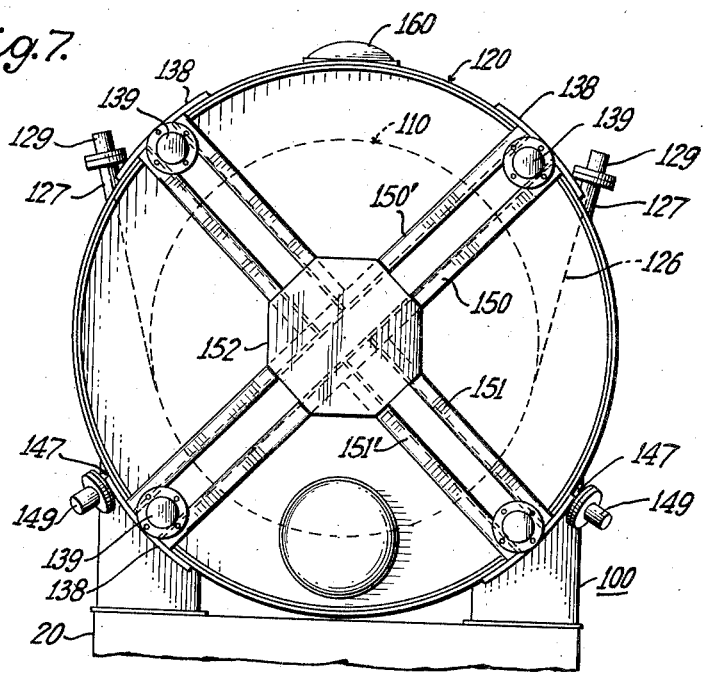
Fig. 7 is an end elevational view showing end bracing employed in the modified form.
Figure 8:
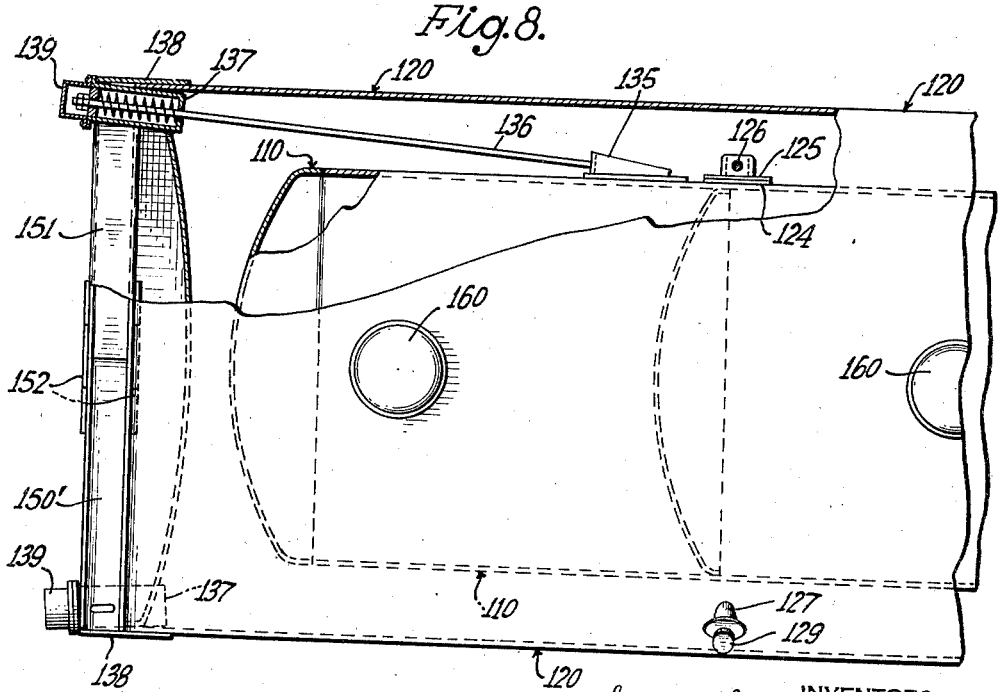
Fig. 8 is a top plan view, parts being broken away to illustrate better certain details of the modification shown in Fig. 6.

In the modification shown in Figs. 6 to 8, the double-walled container consists of an inner vessel 110 and an outer vessel 120 arranged concentrically to provide an intervening space for insulating purposes. An externally associated frame 100 (see Fig. 7) here supports the vessels by separate means and consists of leg members secured on the exterior of the vessel 120 and are in turn supported on the car frame, shown generally at 20. Cooperating with the exterior frame are a pair of stiffening rings 121 and 122 which are snugly fitted into the outer vessel and secured to the inner wall by welding or brazing in the region of the exterior attachment of the legs of the exterior frame. These rings are so spaced that they not only stiffen and support the wall of the outer vessel but transmit a portion of the weight of the whole container to the leg members.

To support the inner vessel from the frame 100, a support is provided comprising lugs 125 which in this instance may be welded directly to the inner vessel and from which supporting rods 126 extend upwardly and outwardly to an anchoring device made fast externally to the wall of the outer vessel. Such devices communicate with the intervening space through suitable openings provided in the region of the wall of the outer vessel which is between the rings 121 and 122. The anchoring device thus cooperates with these stiffening rings to transmit the stress therefrom directly to the exterior frame 100. This anchoring device may have any convenient form, for example, a sleeve 127 welded or brazed to the wall of vessel 120 about the opening therein, the rod 126 being made fast therein at its upper end. Such sleeve is then hermetically sealed in any suitable manner, for example, by securing a cap, as shown at 129, over the outer end of the sleeve.

The inner vessel 110 is braced in the outer vessel 120 against endwise motion and against side swaying, as in the form of invention shown in Fig. 1. In the present form, however, a simpler external bracing structure is provided on the ends of the outer vessel. In order readily to accommodate the simpler structure, the end walls of the outer vessel are provided with inwardly dished surfaces instead of outwardly dished surfaces, as in the first-described modification. Here, the exterior cylindrical wall of the inner vessel has secured to it brackets 135, taken as four in number in the interests of simplicity, from which extend rods 136 that are anchored resiliently in sleeves 137 (see Fig. 8) that are welded in place in the end wall and hermetically sealed by caps 139. Bracing plates 138 are also preferably applied for strengthening the support of the sleeve in the end wall.

To brace this inner vessel against side swaying, brackets 145 are secured on the end wall of the inner vessel and rods 146 attached thereto which are rigidly anchored in sleeves 147 that are inserted laterally in the cylindrical wall of the outer vessel in a manner similar to those at 127 but in a different region of the outer wall. Sleeves 147 are closed hermetically by caps 149.

To redistribute the end thrusts transmitted to the sleeve devices 137, a simplified end bracing structure is employed. This structure, as shown particularly in Fig. 7, comprises a cross-like structure connected to the four sleeves 137. This cross-like structure may be constructed in any convenient manner, for example, of a pair of relatively wide channel members 150 and 150' that embrace the two sides of a sleeve 137 and extend clear across the end of the outer vessel to embrace the sides of the diametrically opposite sleeves 137. Similar short members 151 and 151' are arranged to engage with the sides of the other pair of diametrically opposite sleeves 137, these short members extending to the center where they are interrupted to accommodate the passage of the first-named pair. These cross-members are anchored at their ends in a circularly formed member 138 of angle-iron fixedly secured on the end of the outer vessel. The center of the cross-members is also strengthened by suitable means, as centrally applied plates 152, which may be brazed or otherwise secured to the cross-members. Manholes with domes 160 are provided in the wall of the outer vessel in this modification as well as in the first-described modification.

Figure 9:
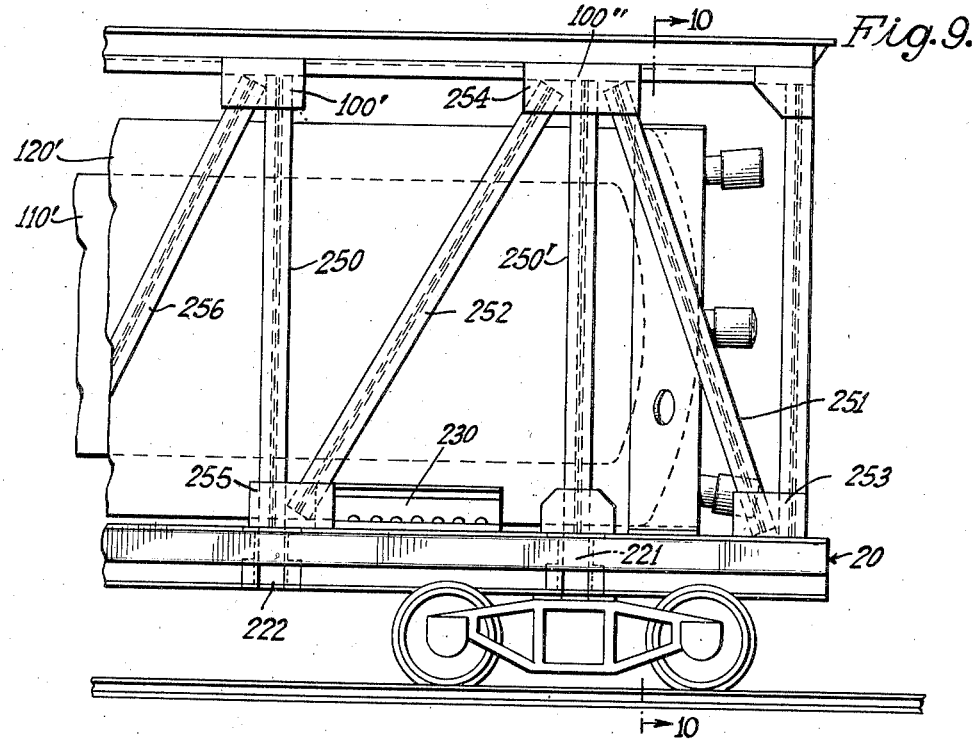
Fig. 9 is a fragmentary elevational view showing still another modification.

Another form of support for the double-walled container is shown in the modification of the invention illustrated in Figs. 9 and 10. Here, the supporting structure is not incorporated with the walls of the outer vessel but provides a basket-like support for the outer vessel which is arranged cooperatively with the sides of a car housing structure 200 that is associated with the car frame 20. To this a plurality of uprights 250, 251', etc. are mounted on the car frame.

The inner vessel is indicated at 110' while the outer vessel is shown at 120'. Exterior spanning or bracing members 100' and 100" extend between the upright members 250, 250', etc., disposed at proper intervals along the car frame, for example, over the main car bolster 221, there being also preferably additional bolsters, as shown at 222. Webs or plates fill the space between the outer vessel and the members 100' and 100". A web member for securing the outer vessel to the car frame is here shown at 230.

In order that this structure may be resistant to end thrusts and cooperate with the car housing structure 200, diagonal members are incorporated to form a girder structure, such members being shown at 251 and 252. The juncture of these members with the car frame may be strengthened by interposing stiffening plates as shown at 253, 254, and 255.

The hermetically sealed space between the inner and outer vessels here provided is preferably evacuated when the tank car is in service. Such evacuation is conveniently accomplished by providing a connection in the wall of the outer vessel and connecting a suitable vacuum pulling means, for example, a mechanical vacuum pump, which may be applied until a vacuum of the order of 0.1 mm of mercury is pulled; the employment of vacuums of this order for the purpose of increasing the efficiency of powder filled insulating spaces being taught and claimed in copending application, Serial No. 307,945, filed December 7, 1939 in the name of L. I. Dana.

In transit, it is seen that the inner and outer vessels of double-walled tank car containers are braced against end thrusts and side swaying, the construction in the walls of the inner vessel being arranged to draw the rods into positions such that the collars have their shoulders in engagement with the housing. It is also seen that the concentration of stress thus impressed on the end wall of an outer vessel is redistributed and transmitted as a compression stress to its cylindrical wall.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, and tension suspension means in said space connecting each end of said inner vessel to the adjacent end wall of said outer vessel.

2. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, and tension suspension means in said space connecting each end of said inner vessel to the adjacent end wall of said outer vessel, and additional means in said space for bracing said inner vessel against side swaying in the outer vessel.

3. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, tension suspension means in said space connecting each end of said inner vessel to the adjacent end wall of said outer vessel, and means for resolving the stresses transmitted by said tension suspension means into components transmittible to the cylindrical wall of said outer vessel.

4. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, tension suspension means in said space connecting each end of said inner vessel to the adjacent end wall of said outer vessel, additional means in said space for bracing said inner vessel against side swaying in the outer vessel, and means for resolving the stresses transmitted by said tension suspension means into components transmittible to the cylindrical wall of said outer vessel.

5. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, tension suspension means in said space connecting each end of said inner vessel to the adjacent end wall of said outer vessel, hermetically sealed anchoring receptacles for said tension suspension means mounted in and protruding through said end walls, additional means in said space for bracing said inner vessel against side swaying in the outer vessel, and a bracing structure on the exterior of each of said end walls of said outer vessel and connected to receive the stresses of said tension suspension means, said structure incorporating resolving members, each arranged for transmitting an impressed stress as a compression to the cylindrical wall of said outer vessel.

6. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, tension suspension means in said space connecting each end of said inner vessel to the adjacent end wall of said outer vessel, hermetically sealed anchoring receptacles for said tension suspension means mounted in and protruding through said end walls, additional means in said space for bracing said inner vessel against side swaying in the outer vessel, and a bracing structure on the exterior of each of said end walls of said outer vessel and connected to receive the stresses of said tension suspension means; said structure on each end wall comprising a plurality of radial members disposed to engage with protruding portions of said receptacles, and thrust transmitting members connected between said radial members and the cylindrical wall of said outer vessel.

7. In double-walled insulated tank cars, the combination with an inner cylindrical vessel having end walls and adapted for holding a liquefied gas, of an outer cylindrical vessel having end walls surrounding and spaced from said inner vessel in a manner such that a closed space intervenes, a car frame for carrying said vessels, supporting frames disposed on said car frame at desired points and separately connected with each of said vessels, tension suspension means in said space connecting each end of said inner vessel to the adjacent end wall of said outer vessel, hermetically sealed anchoring receptacles for said tension suspension means mounted in and protruding through said end walls, resilient means in said receptacles for yieldingly holding said tension suspension means taut, additional receptacles hermetically sealed and mounted in and protruding through said end walls at points near the bottom and equally spaced from a medial plane, sway-stopping members secured to the ends of said inner vessel and anchored in said additional receptacles, and a bracing structure on the exterior of each of said end walls of said outer vessel and connected to receive the stresses of said tension suspension means; said structure comprising a central member, a plurality of pairs of radial members disposed to embrace said protruding portions of said first-named receptacles, and thrust members interposed between the ends of said radial members and the cylindrical wall of said outer vessel.

8. A double-walled insulated tank car construction having an insulating space between the walls and of the kind set forth in claim 2, in which the means in the insulating space for bracing the inner vessel against side swaying in the outer vessel comprises a plurality of anchoring devices on the end of said inner vessel, each provided with a tension transmitting rod of relatively low thermal conductivity arranged to extend downwardly and outwardly, an anchoring sleeve for each of said rods secured in the wall of said outer vessel, said sleeves each having an interiorly extending portion, rigidifying webs interposed about said inwardly extending portions and welded in place, a tension receiving collar rigidly secured in each of said sleeves in which the lower ends of each of said rods is made fast, and a closure for hermetically sealing the outer end of each of said sleeves; said closures being soft soldered in place.

GEORGE H. ZENNER.
JAMES G. VAN VLEET.
ODD A. HANSEN.